(12) United States Patent
Ficklscherer et al.

(10) Patent No.: US 8,829,701 B2
(45) Date of Patent: Sep. 9, 2014

(54) RESONANT MODE DAMPING SYSTEM AND METHOD

(71) Applicant: Pratt & Whitney Canada Corp., Longueuil (CA)

(72) Inventors: Peter Ficklscherer, Schoefweg (DE); Reza Pedrami, Montreal (CA)

(73) Assignee: Pratt & Whitney Canada Corp., Longueuil, Quebec (CA)

( * ) Notice: Subject to any disclaimer, the term of this patent is extended or adjusted under 35 U.S.C. 154(b) by 35 days.

(21) Appl. No.: 13/649,358

(22) Filed: Oct. 11, 2012

(65) Prior Publication Data
US 2014/0103884 A1   Apr. 17, 2014

(51) Int. Cl.
*F01D 15/10* (2006.01)
*F03D 7/02* (2006.01)

(52) U.S. Cl.
CPC .................................. *F03D 7/0272* (2013.01)
USPC .................. 290/52; 290/55; 322/19

(58) Field of Classification Search
CPC ............................ Y02E 10/723; F03D 7/0272
See application file for complete search history.

(56) References Cited

U.S. PATENT DOCUMENTS

| | | | |
|---|---|---|---|
| 4,411,595 A | 10/1983 | Pisano | |
| 4,453,378 A | 6/1984 | Zagranski et al. | |
| 4,531,361 A | 7/1985 | Zagranski et al. | |
| 5,303,142 A | 4/1994 | Parsons et al. | |
| 6,921,248 B2 | 7/2005 | Almeras | |
| 6,986,641 B1 | 1/2006 | Desai et al. | |
| 7,042,110 B2* | 5/2006 | Mikhail et al. | 290/44 |
| 7,309,930 B2* | 12/2007 | Suryanarayanan et al. | 290/55 |
| 2010/0111693 A1* | 5/2010 | Wilson | 416/1 |
| 2013/0234642 A1* | 9/2013 | Igarashi et al. | 318/611 |

* cited by examiner

*Primary Examiner* — Michael Zarroli
(74) *Attorney, Agent, or Firm* — Norton Rose Fulbright Canada LLP

(57) ABSTRACT

A control system for increasing the damping of a resonant mode of a rotor drive train is provided. A control loop is introduced in parallel with the free turbine speed governing control loop. The control loop receives a feedback signal from the free turbine and rotor drive train, the feedback signal representative of the free turbine speed. The control loop extracts the resonant component from the feedback signal to generate a resonant signal containing the resonant component and estimates a derivative of the free turbine speed from the resonant signal. The control loop then outputs a request for damping the resonant mode on the basis of the derivative. A narrow-band reject filter is introduced in the free turbine speed governing loop to filter out the resonant component from the feedback signal, thereby ensuring that the free turbine speed governing loop does not interfere with the control loop.

16 Claims, 9 Drawing Sheets

RESONANT MODE DAMPING SYSTEM AND METHOD

TECHNICAL FIELD

The application relates generally to a system and method for increasing the damping of a resonant mode of a rotor drive train.

BACKGROUND OF THE ART

Resonance phenomena, which may cause vibrations of the drive train of a machine, such as a helicopter, may be engendered by the coupling of the natural modes of the drive train to those of the fuselage through the variation of the rotor speed and the yawing motion of the fuselage. The vibrations may in turn render the overall machine unstable or difficult to control. It is therefore desirable to damp such a resonance of the drive train.

Various methods may be used for increasing the damping of the rotor resonance. Resonance damping may for instance result from the aerodynamic drag on the rotor blades, gear reductions, and inherent losses in the system. However, such damping may not be sufficient and additional damping may be desirable. For this purpose, control systems, which increase the resonance damping, may be used. However, such systems are typically complex and require high computational power.

There is therefore a need for an improved system and method for damping a resonant mode of a rotor drive train.

SUMMARY

In one aspect, there is provided a system for damping at least one resonant mode of a rotor drive train of an engine having a generator comprising a free turbine, the at least one resonant mode occurring at at least one resonant frequency, the system comprising a filtering unit adapted to receive a speed signal indicative of a present measurement of a speed of rotation of the free turbine and containing the at least one resonant frequency and a plurality of contributing frequencies, the filtering unit adapted to decouple the speed signal into a resonant signal containing the at least one resonant frequency with the contributing frequencies attenuated and a resonant-free signal containing the plurality of contributing frequencies with the at least one resonant frequency attenuated; and a compensator unit coupled to the filtering unit and adapted to receive the resonant signal and estimate therefrom a derivative of the speed signal and to generate from the derivative a damping signal indicative of a request to adjust a speed of the generator for damping the at least one resonant mode.

In another aspect, there is provided a method for damping at least one resonant mode of a rotor drive train of an engine having a generator comprising a free turbine, the at least one resonant mode occurring at at least one resonant frequency, the method comprising receiving a speed signal indicative of a present measurement of a speed of rotation of the free turbine and containing the at least one resonant frequency and a plurality of contributing frequencies; decoupling the speed signal into a resonant signal containing the at least one resonant frequency with the contributing frequencies attenuated and a resonant-free signal containing the plurality of contributing frequencies with the at least one resonant frequency attenuated; estimating from the resonant signal a derivative of the speed signal; and generating from the derivative a damping signal indicative of a request to adjust a speed of the generator for damping the at least one resonant mode.

In a further aspect, there is provided a system for damping at least one resonant mode of a rotor drive train of an engine having a generator comprising a free turbine, the at least one resonant mode occurring at at least one resonant frequency, the system comprising means for receiving a speed signal indicative of a present measurement of a speed of rotation of the free turbine and containing the at least one resonant frequency and a plurality of contributing frequencies; means for decoupling the speed signal into a resonant signal containing the at least one resonant frequency with the contributing frequencies attenuated and a resonant free signal containing the plurality of contributing frequencies with the at least one resonant frequency attenuated; means for estimating from the resonant signal a derivative of the speed signal; and means for generating from the derivative a damping signal indicative of a request to adjust a speed of the generator for damping the at least one resonant mode.

DESCRIPTION OF THE DRAWINGS

Reference is now made to the accompanying figures in which:

FIG. 3c is a schematic diagram of the rotor resonance disturbance rejection controller, the free turbine speed governing controller, and the engine and rotor system of FIG. 3a;

FIG. 5b is a flowchart of an illustrative embodiment of the damping request signal generation step of FIG. 5a.

DETAILED DESCRIPTION

Figure 1:
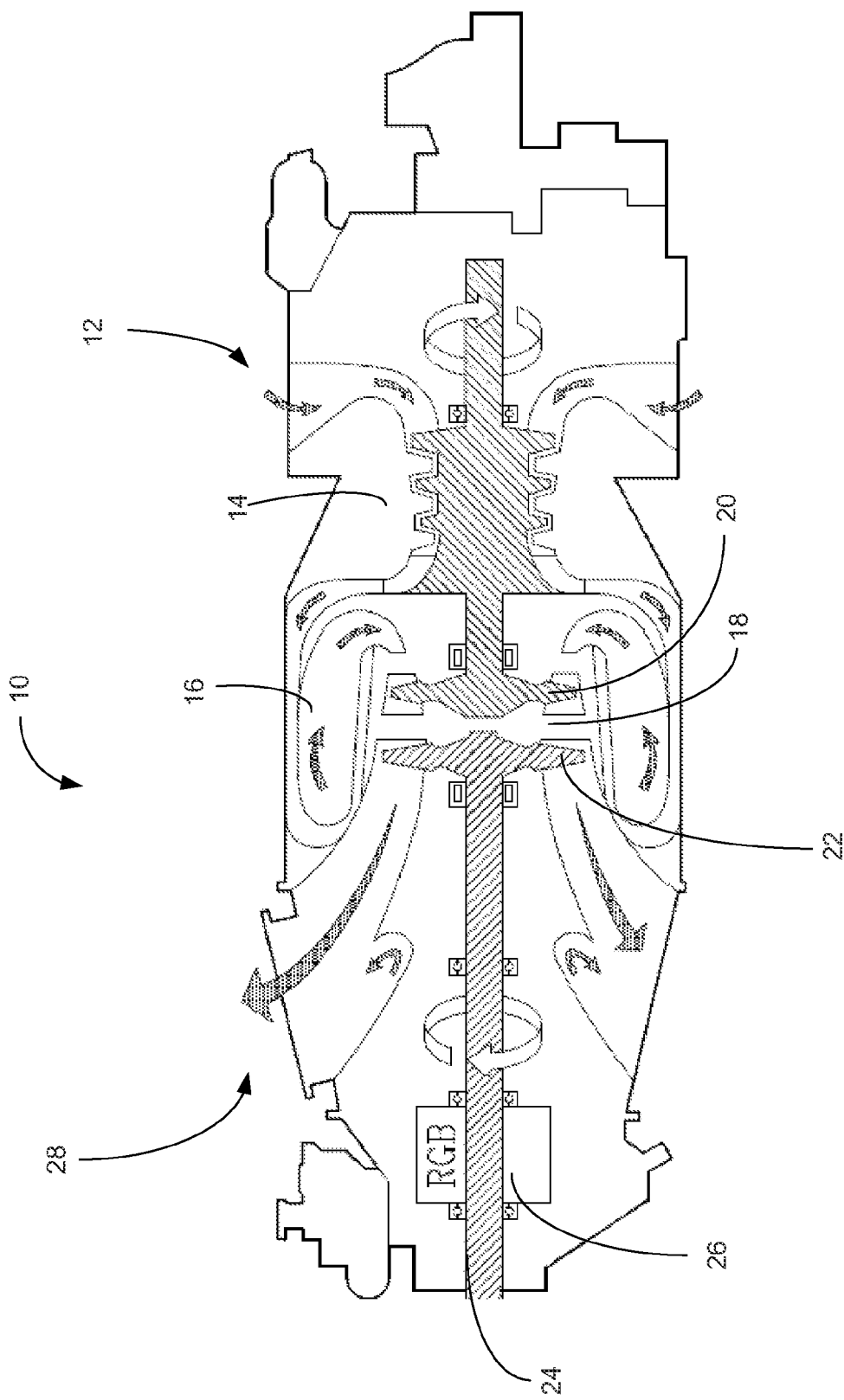
FIG. 1 is a schematic side cross-sectional view of a gas turbine engine.

FIG. 1 illustrates a gas turbine engine 10, of a type typically provided for use in subsonic flight, comprising an inlet 12, through which ambient air is propelled, a compressor section 14 for pressurizing the air, a combustor 16 in which the compressed air is mixed with fuel and ignited for generating an annular stream of hot combustion gases, and a turbine section 18 for extracting energy from the combustion gases. The turbine section 18 illustratively comprises a compressor turbine 20, which drives the compressor assembly and accessories, and at least one power or free turbine 22, which is independent from the compressor turbine 20 and drives a propeller shaft 24 through a reduction gearbox 26. Hot gases may then be evacuated through exhaust stubs 28. The gas generator 29 of the engine 10 illustratively comprises the compressor section 14, the combustor 16, and the turbine section 18.

Figure 2:
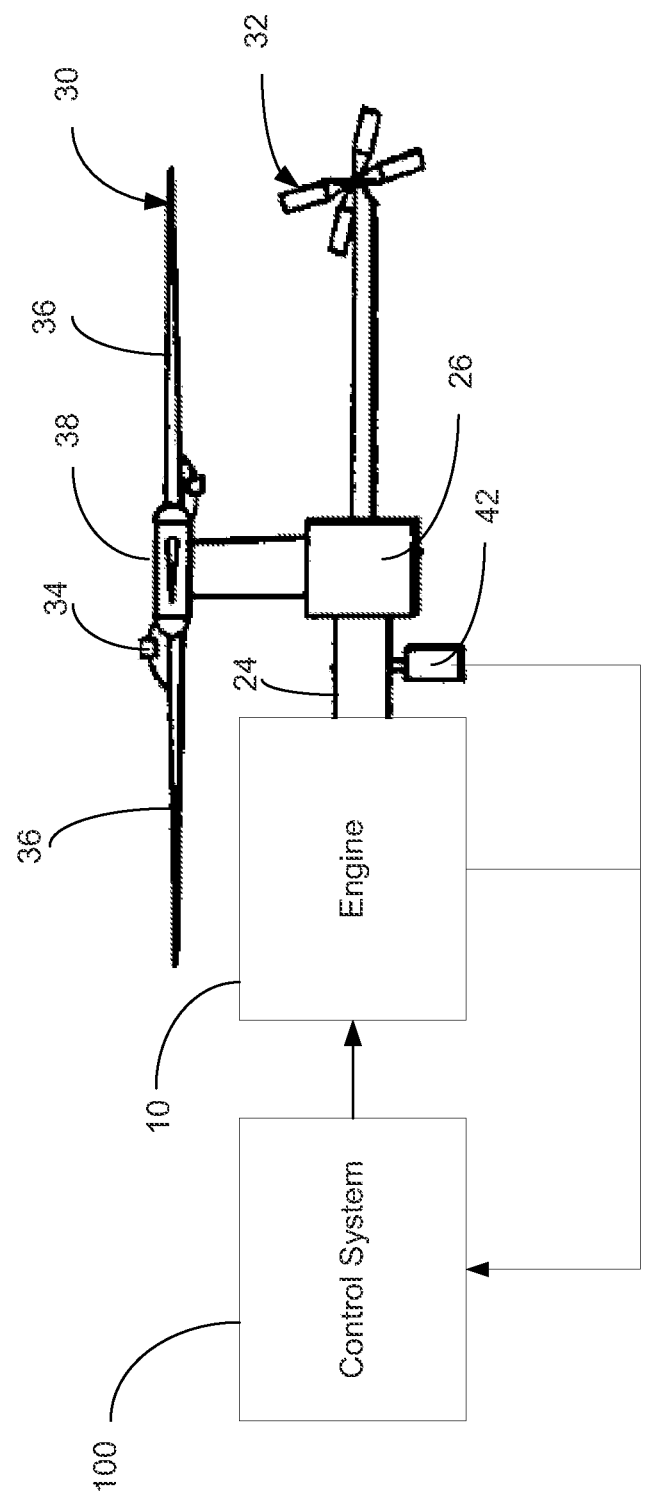
FIG. 2 is a schematic diagram of a system for damping a resonant mode of a rotor drive train in accordance with a first illustrative embodiment.

Referring to FIG. 2 in addition to FIG. 1, the propeller shaft 24 may mechanically couple via the gearbox 26 the free turbine 22 to a main rotor 30 and a tail rotor 32 of a helicopter.

Viscous lag dampers 34 may be coupled between the blades 36 of the main rotor 30 and a rotor hub 38 to increase the damping of the torsional oscillations of the main rotor 30 and of the tail rotor 32, such oscillations illustratively occurring at frequencies in a range of 2 to 8 Hz. Alternatively, the dampers 34 may be positioned between each blade 36. A rotor drive train (reference 40 in FIG. 3b) illustratively consists of the free turbine 22, the gearbox 26, the main rotor blades 36, the rotor hub 38, and the tail rotor 32.

A sensor 42 may further be coupled to the propeller shaft 24 to provide an output signal representative of the engine speed. A control system 100 may receive the turbine speed measurement along with additional engine parameters and output signals used for controlling the operation of the engine 10, as will be discussed below. In particular, the control system 100 may be used to modulate a flow of fuel to the engine 10 in order to increase the damping of the torsional oscillations of the rotor drive train. As more load is usually present on the main rotor blades 36, torsional oscillations of the main rotor 30 may be dominant, and thus more problematic, and it may therefore be desirable to mainly damp the main rotor resonance. Still, although the description below refers to damping of the resonance of the main rotor 30, it should be understood that the resonance of the tail rotor 32 may also be damped.

The control system 100 may be part of a Full Authority Digital Engine Control (FADEC) used to manage operation of the engine 10 by modulating fuel flow thereto, thereby controlling the engine 10 through acceleration, deceleration, and steady state operation. As such, the control system 100 may comprise a digital computer or Engine Control Unit (ECU, not shown) in communication with the hardware of the engine 10 for controlling an operation of the latter. The control system 100 may then be implemented as a processor-based system where the term processor may refer to a microprocessor, application specific integrated circuits (ASIC), logic circuits, or any other suitable processor or circuit know to those skilled in the art.

Figure 3A:
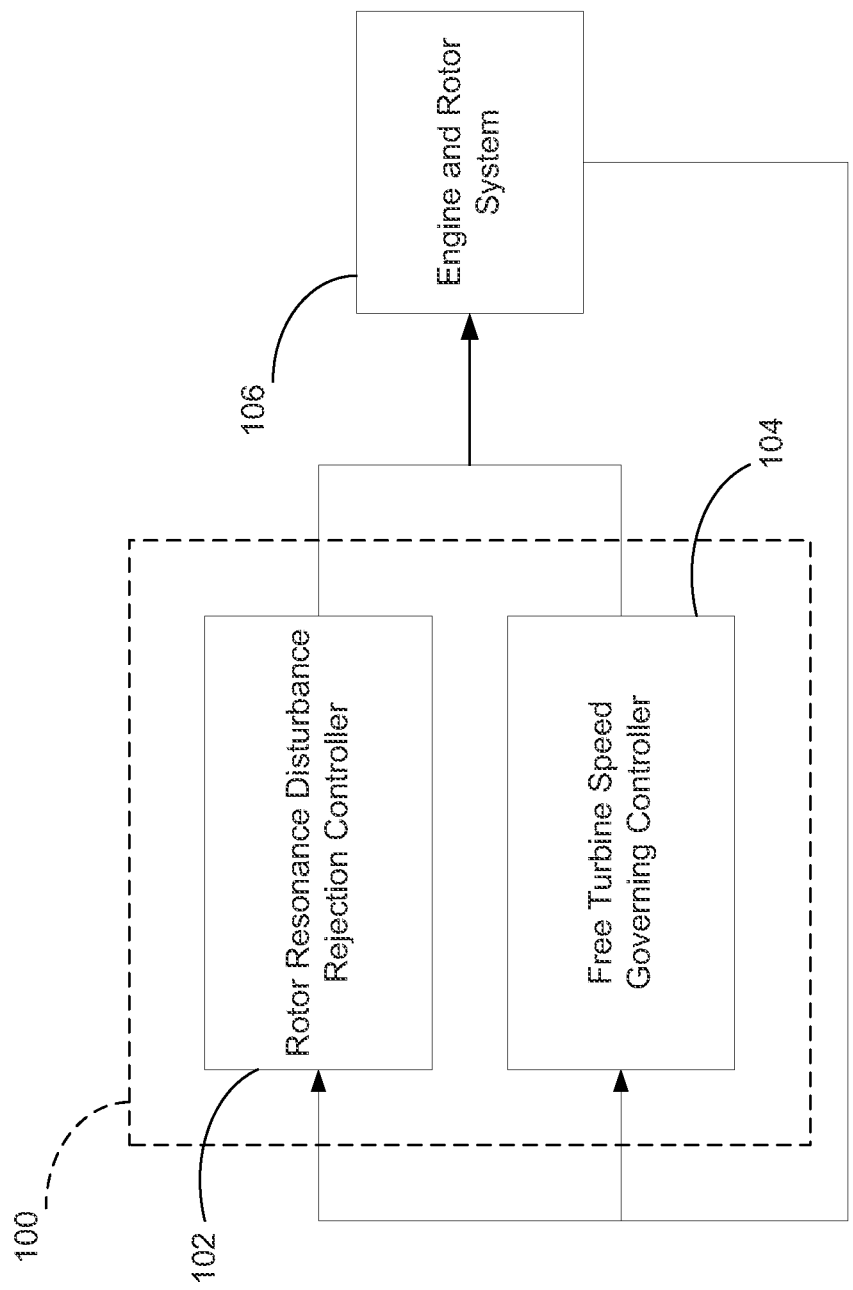
FIG. 3a is a schematic diagram of the control system of FIG. 2.

Referring to FIG. 3a, the control system 100 illustratively comprises a Rotor Resonance Disturbance Rejection Controller (RRDRC) 102 provided in parallel with a Free Turbine Speed Governing Controller 104. Both controllers 102 and 104 may be used to control an engine and rotor system 106.

Figure 3B:
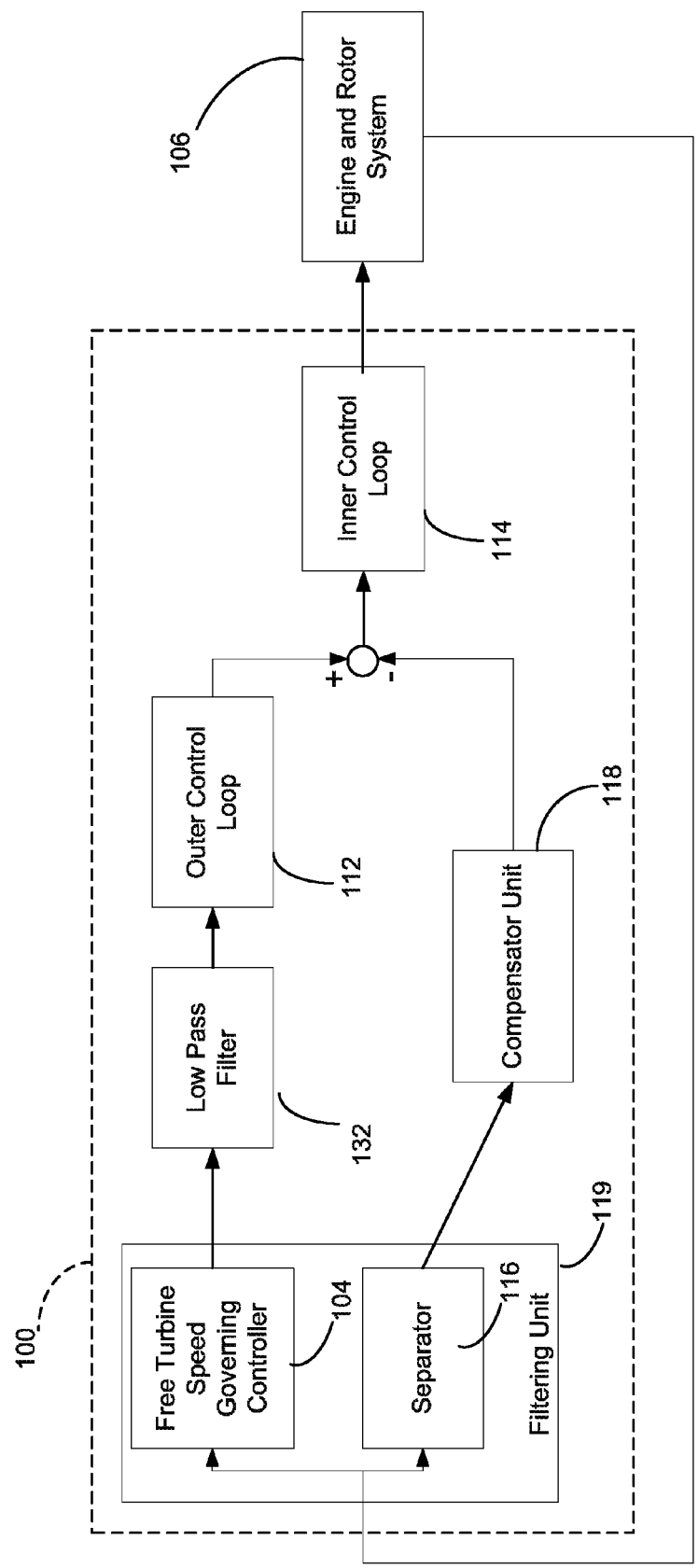
FIG. 3b. is a schematic diagram of the control system of FIG. 3a showing the filtering unit.
Figure 3C:
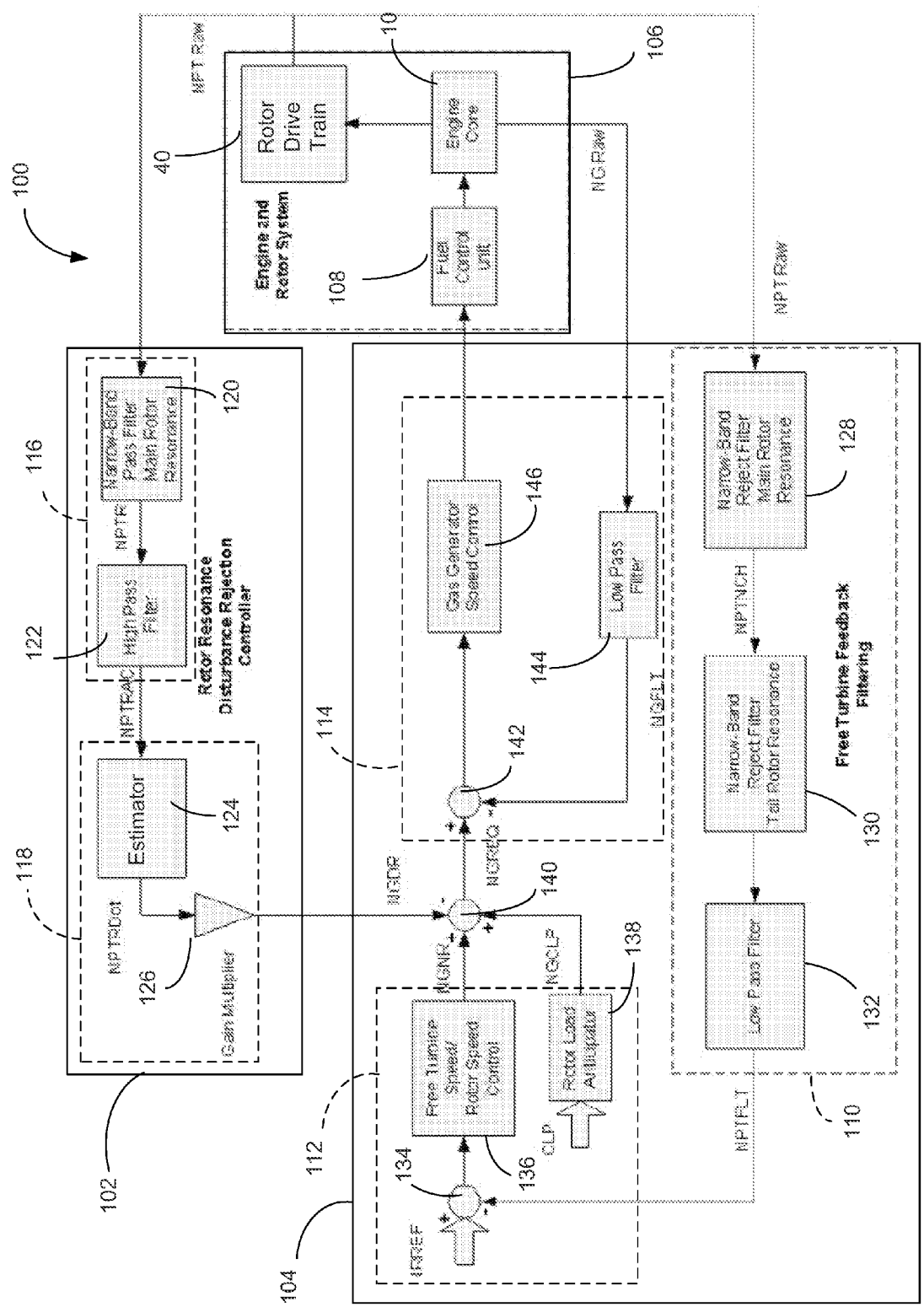

Referring to FIG. 3b and FIG. 3c, the engine and rotor system 106 illustratively comprises a fuel control unit 108 that controls the engine core 10 and the rotor drive train 40. The Free Turbine Speed Governing Controller 104 illustratively comprises a Free Turbine Feedback filtering unit 110, an outer control loop 112, and an inner control loop 114. The RRDRC 102 illustratively comprises a signal separator 116 and a compensator unit 118. The Free Turbine Feedback filtering unit 110 of the Free Turbine Speed Governing Controller 104 and the signal separator 116 of the RRDRC 102 illustratively collectively constitute a filtering unit 119.

A feedback signal NPTRaw is illustratively output by the free turbine and rotor drive train 40 and sent to the RRDRC 102 and the Free Turbine Speed Governing Controller 104. The feedback signal NPTRaw is illustratively a compound signal containing a plurality of contributing frequencies including the main and tail rotor torsional frequencies and is representative of the speed of rotation of the free turbine 22.

In order to increase the damping of the resonance of the main rotor 30, the RRDRC 102 illustratively extracts the main rotor resonant component from the free turbine feedback signal NPTRaw and responds to this resonant component by increasing the resonant component. In particular, the signal NPTRaw may be received at the signal separator 116 of the RRDRC 102, which may comprise a narrow-band pass filter 120 and a high pass filter 122. The narrow-band pass filter 120 illustratively decouples the received free turbine speed signal NPTRaw and generates an output signal NPTR containing the main rotor resonant frequency. The resonant frequency may be a predetermined value computed from the model of the main rotor 30 and/or measured during flight from the free turbine feedback signal NPTRaw, as known to those skilled in the art. The output signal NPTR, which illustratively comprises the resonant component of the free turbine feedback signal NPTRaw, may then be sent to the high pass filter 122. The high pass filter 122 illustratively operates as a safety filter that removes any remaining steady state errors from the signal NPTR and only allows the resonant frequency to pass therethrough. The high pass filter 122 may then output a signal NPTRAC, which may be sent to the compensator 118. As will be discussed further below, provision of the signal separator 116 may prevent the RRDRC 102 from interfering with the Free Turbine Speed Governing Controller 104. Indeed, the RRDRC 102 illustratively operates at the main rotor resonant frequency whereas the Free Turbine Speed Governing Controller 104 operates in a frequency range, in which the main and tail rotor resonant frequencies are attenuated or excluded altogether.

The compensator 118 illustratively comprises an acceleration estimator 124 and a gain multiplier 126. The acceleration estimator 124 may use an observer or a Kalman filter approach to compute an estimation of the derivative of the NPTRAC signal. An output signal NPTRDot, which is representative of the rate of change of the free turbine speed NPTRaw, i.e. of the acceleration of the free turbine 22 may then be generated. The acceleration estimator 124 is illustratively a second order free running oscillator operating at the rotor resonant frequency. The model of such a second order oscillator, as given by equation (1), may be used to describe the resonance behaviour of the main rotor 30, or of the tail rotor 32 if damping of a resonance thereof is desired:

$$\begin{bmatrix} \dot{\omega} \\ \ddot{\omega} \end{bmatrix} = \begin{bmatrix} 0 & 1 \\ -\omega_0^2 & 0 \end{bmatrix} \begin{bmatrix} \omega \\ \dot{\omega} \end{bmatrix} \quad (1)$$

where $\omega$ is the speed input, i.e. NPTRAC, and $\omega_0$ is the resonant frequency at which the acceleration estimator 124 operates.

The acceleration estimator 124 may therefore operate using knowledge of the torsional resonant frequency alone and using little input information, namely the speed input, about the engine 10 and rotor drive train 40. As a result, use of the RRDRC 102 reduces the complexity of the control system 100 in addition to decreasing the amount of computational power required.

The NPTRDot signal may then be sent to the gain multiplier 126. The latter may multiply the NPTRDot signal by a gain whose value may be selected according to the desired level of damping, where increasing the value of the gain may in turn increase the level of damping. An output signal NGDR, which is illustratively proportional to the derivative of the free turbine speed feedback NPTRaw and representative of the request needed for damping the resonance of the main rotor 30 may then be generated. As damping forces are inversely proportional to the derivative of the free turbine speed, the damping contribution to the overall control system 100 may be taken into account by subtracting the signal NGDR from the output signals NGNR and NGCLP of the outer control loop 112 of the Free Turbine Speed Governing Controller 104.

In order to ensure that the Free Turbine Speed Governing Controller 104 does not interfere with the RRDRC 102, which illustratively operates at the resonant frequency, a first narrow band reject filter 128 may be introduced in the Free Turbine Feedback filtering unit 110 for filtering the free turbine speed feedback NPTRaw at the resonant frequency of the main rotor 30. In particular, the free turbine speed feedback NPTRaw may be filtered so as to attenuate the torsional oscillations occurring at the main rotor resonant frequency. A second high order narrow band reject filter 130 may further be introduced for filtering the output NPTNCH of the first narrow band reject filter 128 at the resonant frequency of the tail rotor 32. A low pass filter 132 may further be provided to remove any remaining unwanted disturbances to generate a signal NPTFLT. The output signal NPTFLT of the Free Turbine Feedback filtering unit 110 may therefore be a signal in which the resonant frequencies of the main rotor 30 and the tail rotor 32 are filtered out or attenuated. As a result, the Free Turbine Speed Governing Controller 104 may operate in a frequency range in which the resonant frequencies of the main rotor 30 and the tail rotor 32 are attenuated. Since the output signal NGDR of the RRDRC 102 essentially contains the main rotor resonant frequency, as discussed above, or alternatively the tail rotor resonant frequency if damping of the resonance of the tail rotor 32 is desired, the controllers 102 and 104 then illustratively operate in different frequency ranges and there may be no interference therebetween in operation. The stability of the Free Turbine Speed Governing Controller 104 and the effectiveness of the RRDRC 102 may therefore be enhanced.

The output signal NPTFLT of the Free Turbine Feedback filtering unit 110 may further be sent to the outer control loop 112, which aims at keeping the speed of the free turbine 22 at a fixed value in order to deliver electrical power at substantially fixed frequency. For this purpose, the outer control loop 112 may receive as inputs the output signal NPTFLT of the free turbine feedback filtering unit 110 and a reference signal NRREF. The signal NRREF is illustratively representative of the reference value of the speed NR of the main rotor 30, which the Free Turbine Speed Governing Controller 104 attempts to maintain despite being subjected to external disturbances such as wind gusts or actions from pedal or air speeds. A difference between the output signal NPTFLT representative of the present speed of the free turbine 22 that drives the main rotor 30 and the reference signal NRREF may be computed at a summing junction 134. The result may then be sent to the free turbine speed/rotor speed control 136, which may output a signal NGNR representative of a request for adjusting the speed of the gas generator 29 to compensate for the error between the reference value NRREF and the actual speed reading NPTFLT.

The outer control loop 112 may further comprise a rotor load anticipator 138, which takes as input a collective pitch (CLP) signal representative of a pilot request for changing the pitch angle of the main rotor blades 36. Because the main and tail rotor resonant modes may be excited during flight as a result of a sudden change in the collective pitch, it may be desirable to take the collective pitch into account. On the basis of the received CLP signal, the rotor load anticipator 138 may generate an output signal NGCLP representative of a request for adjusting the speed of the gas generator 29 to accommodate for a change in power demand due to the variation in collective pitch.

The signal NGDR output by the RRDRC 102 may then be subtracted at the summing junction 140 from the output signals of the outer control loop 112, namely signals NGNR and NGCLP, to generate a signal NGREQ. The signal NGREQ is illustratively representative of the total request for adjusting the speed of the gas generator 29 according to the changes in power demand as detected in the NGNR and NGCLP signals as well as to torsional oscillations to be damped as indicated in the NGDR signal. The signal NGREQ is then illustratively sent to a summing junction 142 of the inner loop 114, where a difference between the signal NGREQ and a signal NGFLT is computed. The signal NGFLT may be output by a low pass filter 144 that filters a signal NGRaw, which is received from the engine 10 and is representative of a present reading of the gas generator speed. The difference between the NGREQ and NGFLT signals is illustratively representative of a need to adjust the gas generator speed in order to compensate for any error between the desired gas generator speed as indicated in the signal NGREQ and the actual gas generator sped as indicated in the signal NGFLT. This difference may be sent to a gas generator speed control 146, which outputs to the fuel control unit 108 a control signal representative of a demanded fuel flow to the engine 10. In particular, upon receiving the control signal from the gas generator speed control 146, the fuel control unit 108 may regulate fuel delivery to the engine 10 for operating the gas generator 29, and accordingly the free turbine 22 and the main rotor 30, at the desired speed, with the resonance damping increased.

Figure 4:
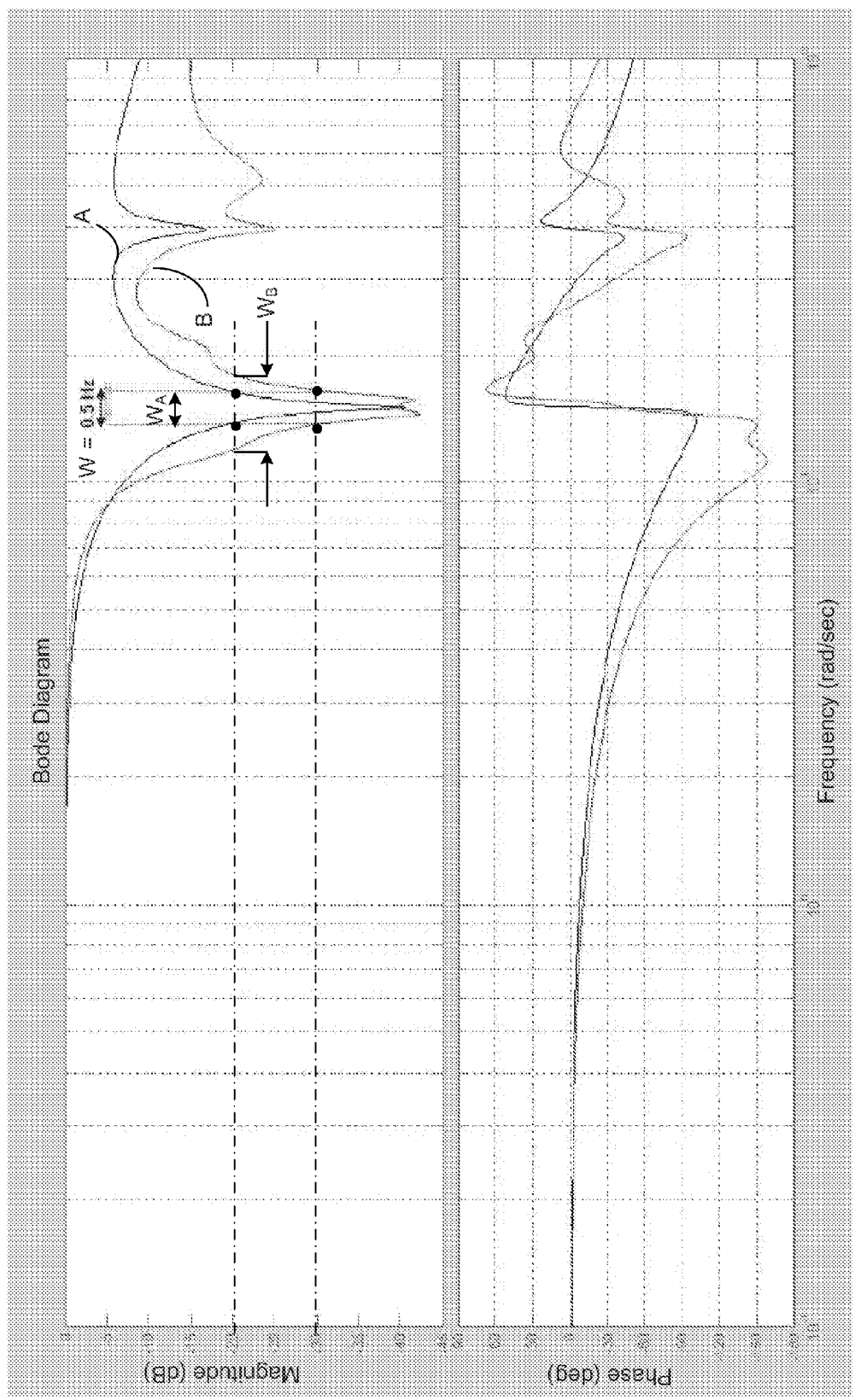
FIG. 4 is a bode plot comparing a baseline notch filter to a narrow-band reject filter of FIG. 3b.

FIG. 4 illustrates the bode plots of the frequency responses of a baseline notch filter versus a narrow-band reject filter as in 128 or 130. As can be seen from curve A, baseline notch filters have a low-order, symmetric frequency response in a narrow band of frequencies. Such filters further exhibit about 20 dB attenuation in a band W of 0.5 Hz about the center frequency, which may be the resonant frequency to be damped. In contrast, the narrow-band reject filters as in 128, 130 illustratively have a higher order frequency response and a band $W_B$ of frequencies, which is wider than the band $W_A$ of frequencies of the baseline notch filter. For instance, at a magnitude of −20 dB, the baseline notch filter operates in a band $W_A$ of frequencies whereas the narrow-band reject filters 128, 130 operate in a band $W_B$ of frequencies, which is wider than $W_A$. In addition, the narrow-band reject filters 128, 130 exhibit about 30 dB attenuation in the band W of 0.5 Hz.

The wider frequency band of the narrow-band reject filters 128, 130 allows taking into account frequency shifts, which may occur as damping is introduced by the RRDRC 102. Indeed, such active damping may slightly shift the resonant frequency of the main rotor 30, or alternatively that of the tail rotor 32 if a resonance thereof is to be damped, from the predetermined value computed using the rotor model as discussed above. As the baseline notch filter operates at a narrow band of frequencies and the magnitude of a filtered signal may therefore be strongly attenuated from one frequency to the next, filtering a signal, such as the free turbine speed signal NPTRaw, about the resonant frequency using the baseline notch filter may not prove robust enough if a frequency shift occurs. The wider frequency band of the narrow-band filters 128, 130 ensures that the magnitude of a filtered signal remains substantially constant over a wider frequency band than the baseline notch filter and thus enables more robust filtering of input signals about the resonant frequency despite potential shifts in the latter.

Figure 5A:
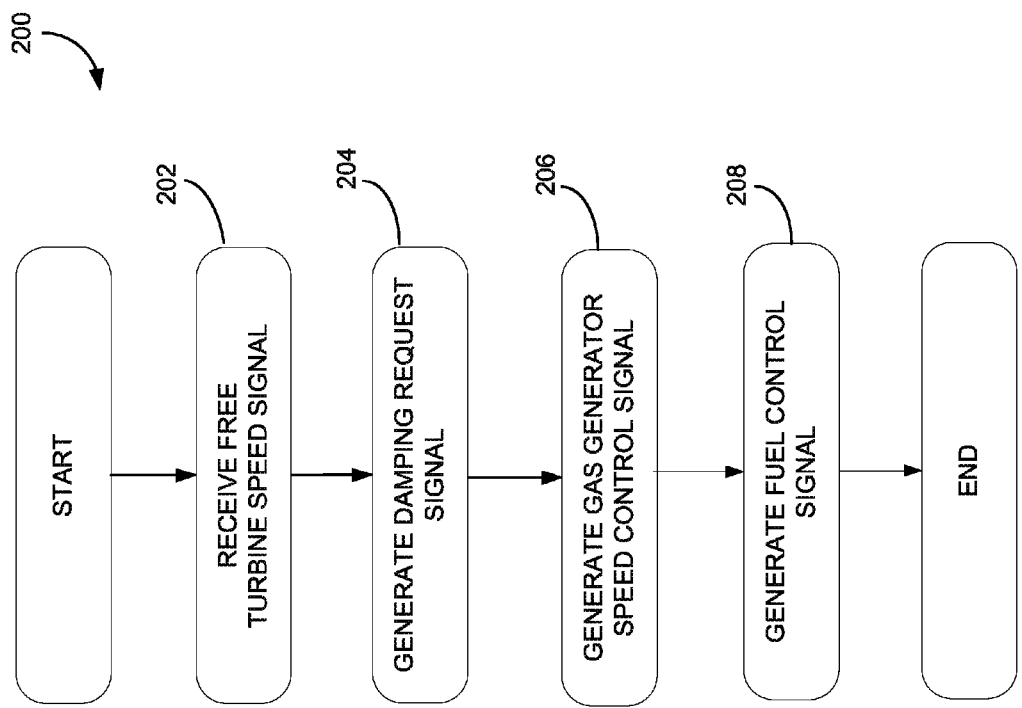
FIG. 5a is a flowchart of a method for damping a resonant mode of a rotor drive train in accordance with an illustrative embodiment.

Referring to FIG. 5a, a method 200 for damping a resonant mode of a rotor drive train will now be described. The method 200 comprises at step 202 receiving the free turbine speed signal NPTRaw. Once the signal NPTRaw is received, a damping request signal NGDR may be generated at step 204, a gas generator speed control signal NGREQ may be generated at step 206, and a fuel control signal may be generated at step 208 according to the generated gas generator speed control signal NGREQ, as discussed above.

Figure 5B:
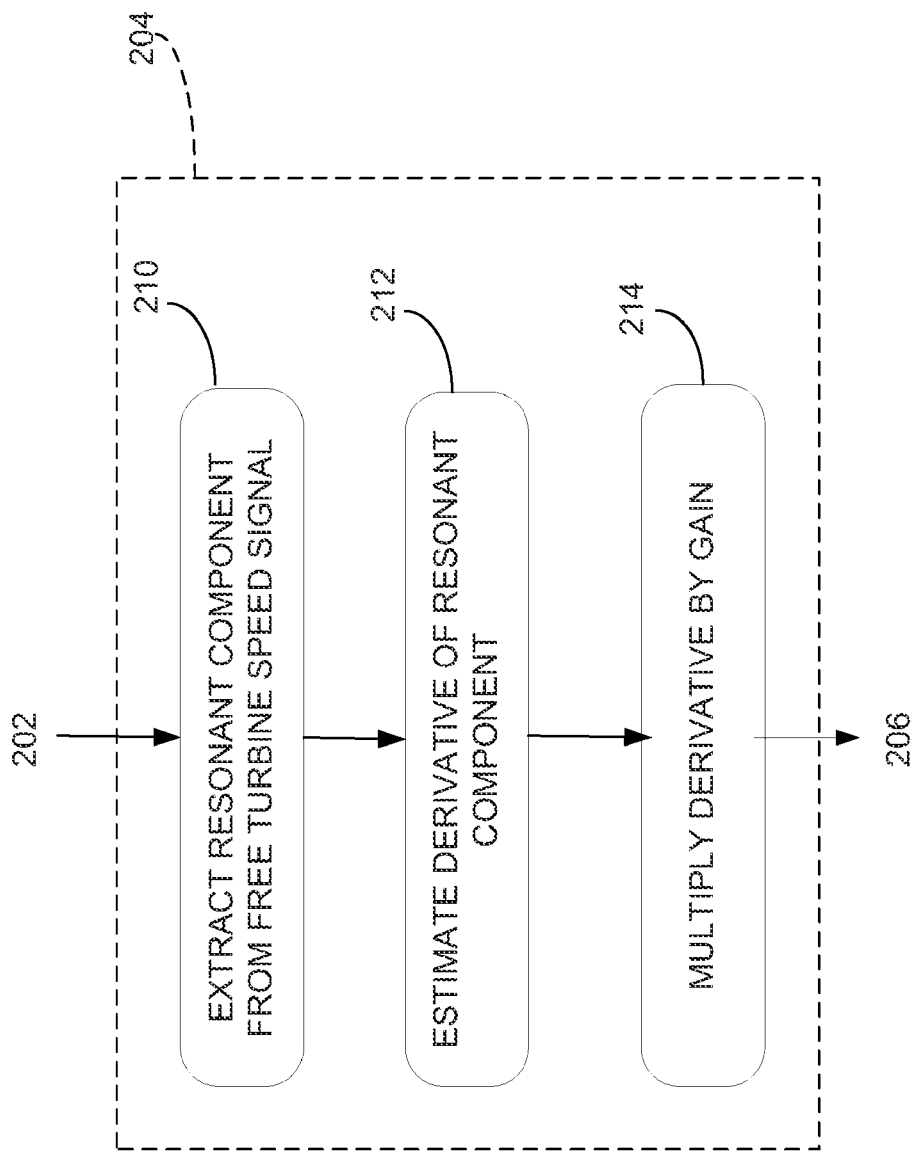

Referring to FIG. 5b, the step 204 of generating a damping request may comprise extracting at step 210 the resonant component from the free turbine speed signal NPTRaw using the signal separator 116, as discussed above. Once the resonant component has been extracted and the output signal NPTRAC comprising such an extracted resonant component generated, a derivative of the resonant component may be estimated at step 212. This may be effected using the estimator 124. The derivative may then be multiplied by a gain at step 214 using the gain multiplier 126.

Figure 5C:
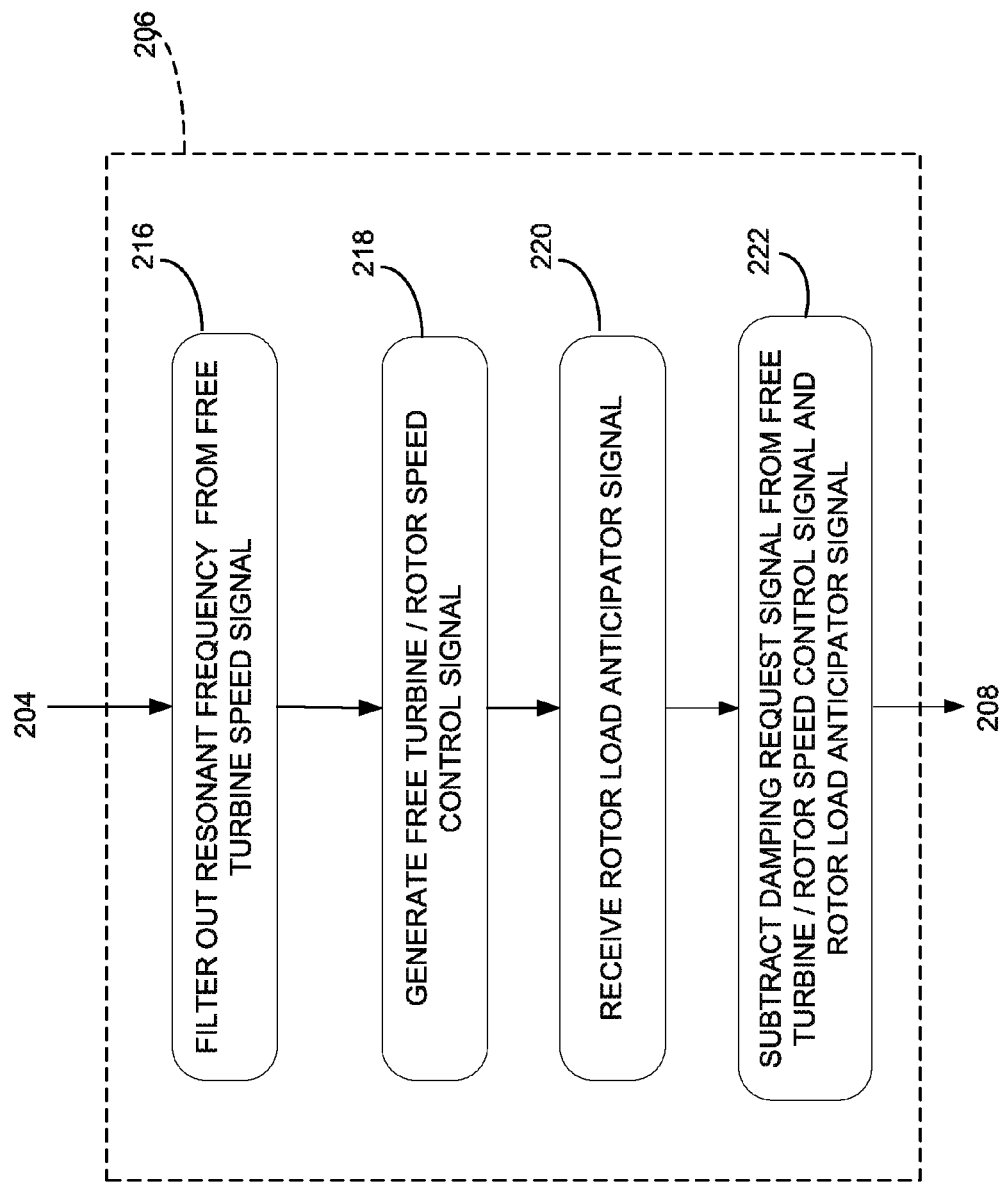
FIG. 5c is a flowchart of an illustrative embodiment of the gas generator speed control signal generation step of FIG. 5b.

Referring to FIG. 5c, the step 206 of generating the gas generator speed control signal NGREQ may comprise filtering out the resonant frequency from the free turbine speed signal NPTRaw at step 216. This may be done using the Free Turbine Feedback filtering unit 110, which may output the signal NPTFLT. A free turbine/rotor speed control signal NGNR may then be generated at step 218 by inputting the difference between the filtered signal NPTFLT output by step 216 and the reference signal NRREF to the free turbine speed/rotor speed control 136, as discussed above. A rotor load anticipator signal NGCLP may then be received at step 220 from the rotor load anticipator 138. At step 222, the damping request signal NGDR may then be subtracted from the free turbine/rotor speed control signal NGNR and the rotor load anticipator signal NGCLP to generate the gas generator speed control signal NGREQ.

The above description is meant to be exemplary only, and one skilled in the art will recognize that changes may be made to the embodiments described without departing from the scope of the invention disclosed. Modifications which fall within the scope of the present invention will be apparent to those skilled in the art, in light of a review of this disclosure, and such modifications are intended to fall within the appended claims.

The invention claimed is:

1. A system for damping at least one resonant mode of a rotor drive train of an engine having a generator comprising a free turbine, the at least one resonant mode occurring at at least one resonant frequency, the system comprising:
a filtering unit adapted to receive a speed signal indicative of a present measurement of a speed of rotation of the free turbine and containing the at least one resonant frequency and a plurality of contributing frequencies, the filtering unit adapted to decouple the speed signal into a resonant signal and a resonant-free signal by attenuating the contributing frequencies to generate from the speed signal the resonant containing the at least one resonant frequency and the attenuated contributing frequencies, and attenuating the at least one resonant frequency to generate from the speed signal the resonant-free signal containing the plurality of contributing frequencies and the attenuated at least one resonant frequency; and
a compensator unit coupled to the filtering unit and adapted to receive the resonant signal and estimate therefrom a derivative of the speed signal and to generate from the derivative a damping signal indicative of a request to adjust a speed of the generator for damping the at least one resonant mode.

2. The system of claim 1, wherein the compensator unit comprises a second order oscillator for estimating the derivative of the speed signal.

3. The system of claim 2, wherein the compensator unit comprises a gain multiplier for multiplying the derivative by a gain to generate the damping signal.

4. The system of claim 1, wherein the filtering unit comprises a band pass filter centered at the at least one resonant frequency and adapted to generate the resonant signal from the speed signal and a narrow-band reject filter centered at the at least one resonant frequency and adapted to generate the resonant-free signal from the speed signal.

5. The system of claim 1, further comprising a free turbine speed governing controller coupled to the filtering unit and to the compensator unit and adapted to subtract the resonant-free signal from a reference speed signal indicative of a desired speed of rotation of the free turbine to generate a first generator speed control signal indicative of a request for adjusting the speed of the generator in response to a difference between the reference speed signal and the resonant-free signal.

6. The system of claim 5, wherein the free turbine speed governing controller is further adapted to subtract the damping signal from the first generator speed control signal to generate a second generator speed control signal, the second generator speed control signal indicative of a request for adjusting the speed of the generator in response to the request for damping the at least one resonant mode.

7. The system of claim 6, wherein the free turbine speed governing controller comprises a fuel control unit and a generator speed controller, the generator speed controller adapted to receive the second generator speed control signal and output to the fuel control unit a fuel control signal indicative of a request to adjust a flow of fuel to the engine.

8. The system of claim 1, wherein the speed signal received by the filtering unit is a feedback speed signal and the damping signal generated by the compensator unit is proportional to the derivative of the feedback speed signal.

9. A method for damping at least one resonant mode of a rotor drive train of an engine having a generator comprising a free turbine, the at least one resonant mode occurring at at least one resonant frequency, the method comprising:
receiving a speed signal indicative of a present measurement of a speed of rotation of the free turbine and containing the at least one resonant frequency and a plurality of contributing frequencies;
decoupling the speed signal into a resonant signal and a resonant-free signal by attenuating the contributing frequencies to generate from the speed signal the resonant signal containing the at least one resonant frequency and the attenuated contributing frequencies, and attenuating the at least one resonant frequency to generate from the speed signal the resonant-free signal containing the plurality of contributing frequencies and the attenuated at least one resonant frequency;
estimating from the resonant signal a derivative of the speed signal; and
generating from the derivative a damping signal indicative of a request to adjust a speed of the generator for damping the at least one resonant mode.

10. The method of claim 9, wherein the speed signal is received as a feedback speed signal and the damping signal is generated as being proportional to the derivative of the feedback speed signal.

11. The method of claim 9, wherein estimating a derivative of the speed signal comprises estimating the derivative using a second order oscillator.

12. The method of claim 11, wherein generating from the derivative a damping signal comprises multiplying the derivative by a gain.

13. The method of claim 9, wherein decoupling the speed signal into the resonant signal and the resonant-free signal comprises filtering the speed signal using a band pass filter centered at the at least one resonant frequency to generate the resonant signal from the speed signal and filtering the speed signal using a narrow-band reject filter centered at the at least one resonant frequency to generate the resonant-free signal from the speed signal.

14. The method of claim 9, further comprising subtracting the resonant-free signal from a reference speed signal indicative of a desired speed of rotation of the free turbine to generate a first generator speed control signal indicative of a request for adjusting the speed of the generator in response to a difference between the reference speed signal and the resonant-free signal.

15. The method of claim 14, further comprising subtracting the damping signal from the first generator speed control signal to generate a second generator speed control signal, the second generator speed control signal indicative of a request for adjusting the speed of the generator in response to the request for damping the at least one resonant mode.

16. The method of claim 15, further comprising generating from the second generator speed control signal a fuel control signal indicative of a request to adjust a flow of fuel to the engine.

* * * * *